United States Patent
Richardson

[15] 3,682,015
[45] Aug. 8, 1972

[54] PINION CONSTRUCTION
[72] Inventor: William S. Richardson, Milwaukee, Wis.
[73] Assignee: The Falk Corporation, Milwaukee, Wis.
[22] Filed: March 5, 1971
[21] Appl. No.: 121,382

[52] U.S. Cl. .......................74/377, 74/411, 74/440, 74/409, 74/410
[51] Int. Cl. ........F16h 3/14, F16h 57/00, F16h 55/18
[58] Field of Search................74/377, 810, 409–411, 74/440

[56] References Cited

UNITED STATES PATENTS

| | | | |
|---|---|---|---|
| 1,197,261 | 9/1916 | Burke | 74/440 |
| 1,404,816 | 1/1922 | Wegstein | 74/440 |
| 2,943,504 | 7/1960 | Falk et al. | 74/377 X |
| 3,350,954 | 11/1967 | Ruettinger | 74/411 X |
| 3,381,548 | 5/1968 | Wolkenstein | 74/411 X |
| 3,405,580 | 10/1968 | Hallden | 74/440 X |
| 3,496,794 | 2/1970 | Forichon | 74/440 |

*Primary Examiner*—Arthur T. McKeon
*Attorney*—Donald G. Casser and Allen W. Leiser

[57] ABSTRACT

A pinion construction comprising a major toothed portion, a minor toothed portion and a shaft wherein there is a torsionally resilient driving means between the minor toothed portion and the shaft, and the teeth on the minor toothed portion are thicker than the teeth on the major toothed portion. A pinion of this construction may be used in a reversing gear drive to provide a reversing pinion which will not vibrate or rattle when it is idling during forward drive operation of the gear drive by virtue of tuning the natural frequency of the reverse gear branch to avoid torsional vibration resonancies.

7 Claims, 8 Drawing Figures

3,682,015

INVENTOR
WILLIAM S. RICHARDSON

BY

ATTORNEY

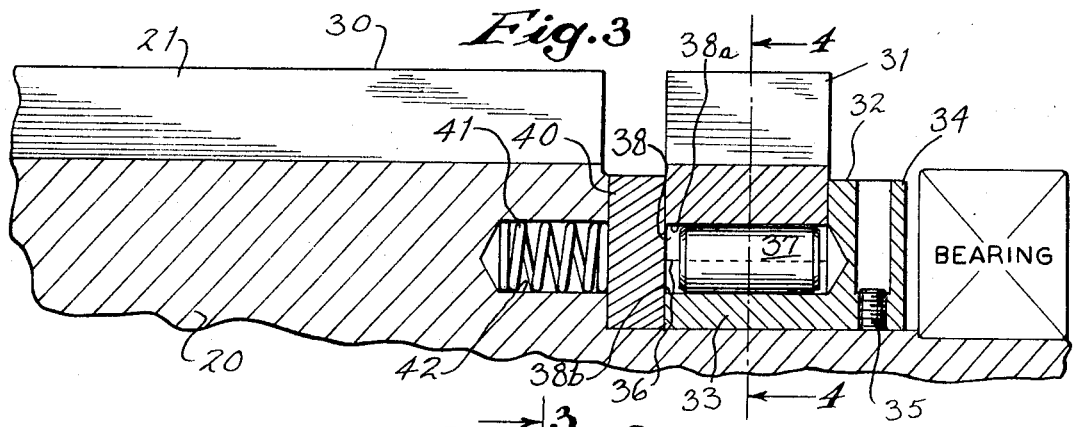
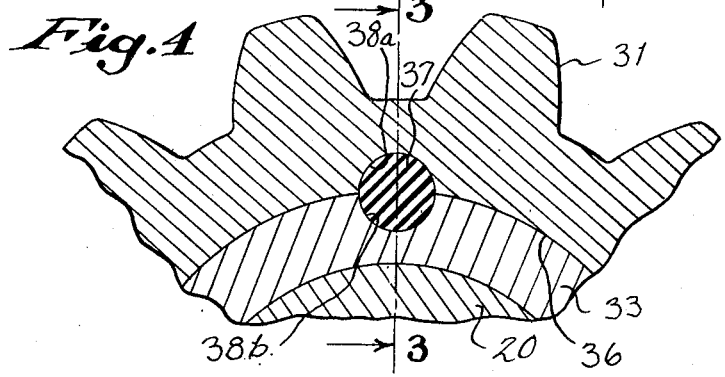
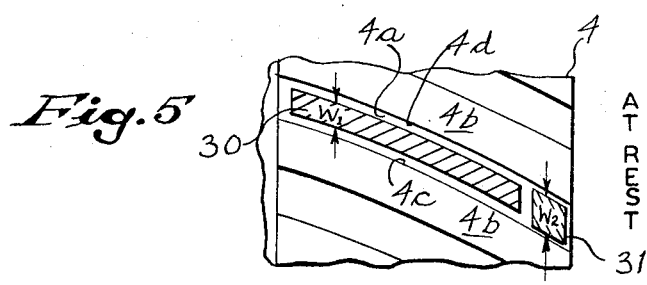
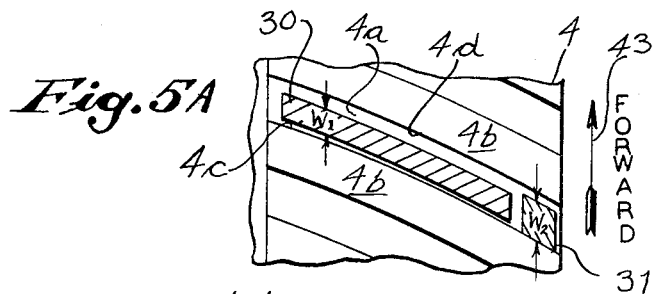
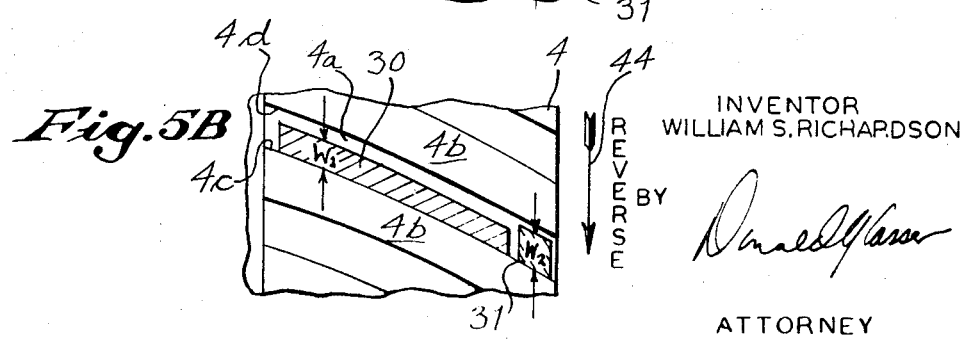

PINION CONSTRUCTION

BACKGROUND OF THE INVENTION

This invention relates to a pinion construction which is adapted to eliminate or reduce damage to a pinion such as can be caused when it is in idle condition while meshed with a driven gear being driven by another pinion.

Various types of gear drives incorporate one pinion which drives the driven or bull gear in one direction and a second pinion which drives the bull gear in an opposite direction. Both pinions may be connected to clutches or other suitable elements so that one or the other can be selectively connected to the prime mover in order to drive the driven gear. When the gear drive is a marine propulsion unit, for example, one pinion may be used to provide forward drive while the other is used to provide reverse drive; both pinions, however, are always meshed with the bull gear and the reverse pinion will thus be in an idle or unloaded condition when the forward driving pinion is connected to drive the bull gear in the forward direction.

The gears in the drive are normally subject to torsional vibration due to firing impulses of engine or propeller blade frequency. If these coincide with the natural frequency of vibration of the reverse train, a resonance occurs which produces high vibratory torque in the reverse train. Problems can arise when the reverse pinion is in the idle condition during forward operation of the gear drive in that vibrations and sporadic rattles can be established in the reverse gear train which can often lead to breaking of gears and gear teeth or other physical damage to the reverse gear train system, as well as a noisy "chattering" operation of the reverse gear train when in its idle condition.

SUMMARY OF THE PRESENT INVENTION

My present invention seeks to obviate the problems caused by vibrations being established in a reverse pinion when in idle condition through the provision of a pinion construction which includes a major toothed portion and a minor toothed portion both supported on a shaft element, wherein the minor toothed portion is connected to the shaft through torsionally flexible driving means, and wherein the minor toothed portion has less backlash than the major toothed portion of the pinion.

During forward operation of a gear drive incorporating a reverse pinion of this construction, the main gear being driven by another pinion would drive the reverse train through the minor toothed portion of the reverse pinion and its torsionally flexible driving means to thereby tune the natural response of the reverse train below any excitation frequency because of the flexibility in the system. During astern operation, the tooth loads would deflect the minor toothed portion of the pinion sufficiently to allow the major toothed portion to come into mesh with the driven gear and transmit the driving load for reverse operation. Thus the minor toothed portion of my new pinion construction is carried on the shaft of the pinion by torsionally flexible driving means, and it is capable of relative rotation, or phase angle shift, in comparison to the major toothed portion of the pinion to enable the latter to transmit driving leads generated when a pinion of this construction is connected to a prime mover.

A main object of this invention is to provide a pinion construction with a first portion rigidly attached to its shaft and a second portion attached to the shaft with torsionally flexible drive means, wherein the first portion is adapted to transmit driving loads and the second portion is adapted to prevent shock or vibration being transmitted to the drive train incorporating the pinion when it is in the idle condition. Another main object is to provide a pinion with two separate toothed portions, one being so mounted as to be capable of relative motion in relation to the other. A more particular main object is to provide a pinion with a major toothed portion and a minor toothed portion in which the minor toothed portion is retained on the pinion shaft and driven by torsionally flexible driving means. A specific object of this invention is to provide the particular pinion constructions hereinafter claimed.

DESCRIPTION OF THE DRAWINGS

The present invention is further described with reference to the following drawings which illustrate several specific embodiments of the invention:

FIG. 3 is an enlarged sectional view, partially broken away, showing the first illustrated embodiment of the present invention in greater detail;

FIG. 4 is a sectional view taken along the plane of line 4—4 of FIG. 3, with portions broken away, also showing details of the first embodiment of this invention;

FIG. 5 is a plan view illustrating a tooth of a pinion of the form shown in FIGS. 3 and 4 of this invention in mesh with a driven gear when the gear drive is at rest, and FIGS. 5A and 5B are similar views showing the gear drive in the forward and reverse drive conditions respectively.

DESCRIPTION OF THE PREFERRED EMBODIMENTS

Figure 1:
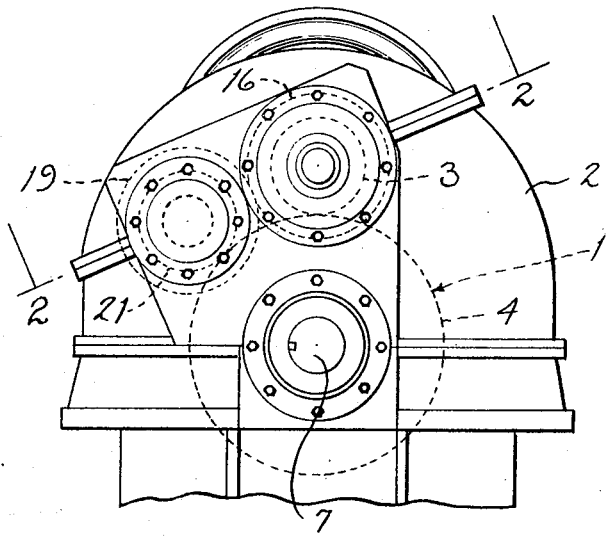
FIG. 1 is an end view of one form of gear drive with which the present invention may be employed.
Figure 2:
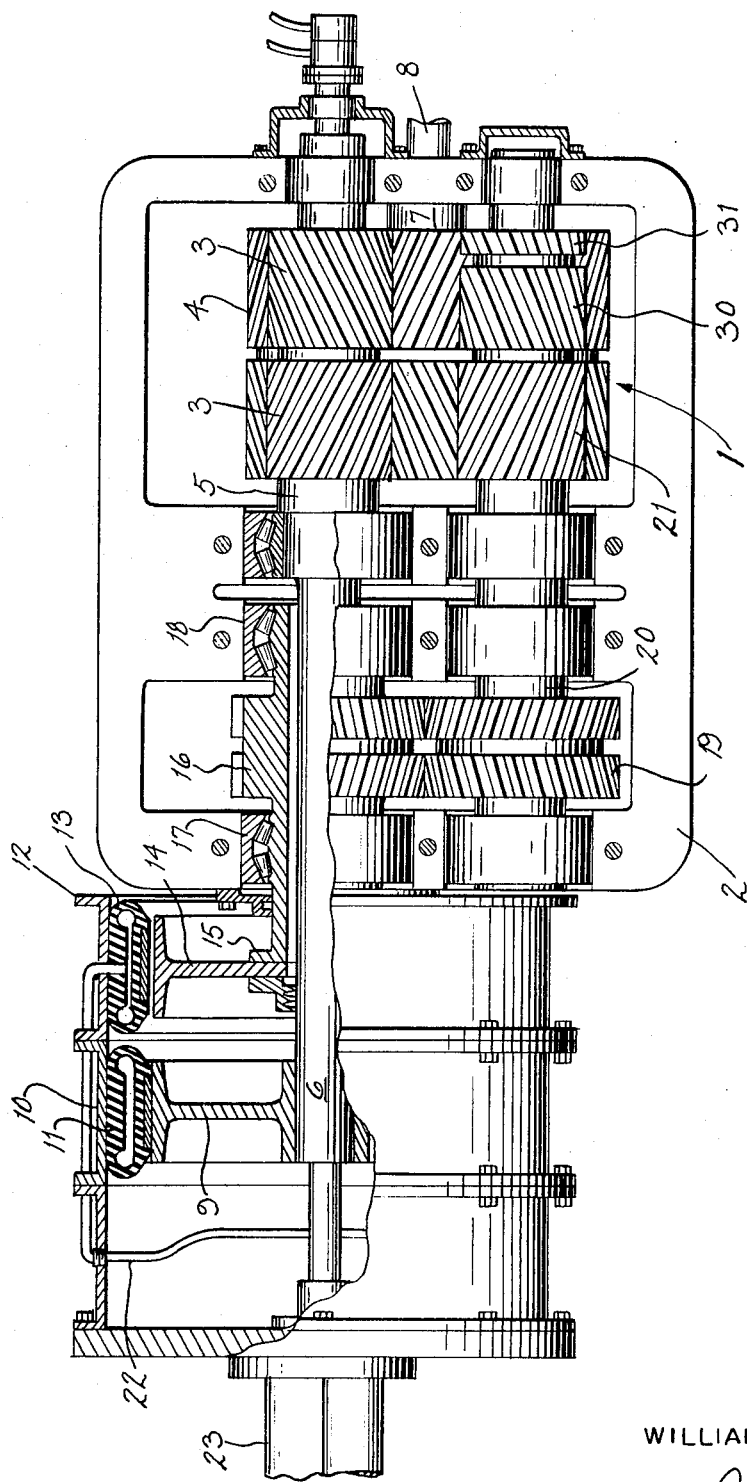
FIG. 2 is a sectional view taken along the plane of line 2—2 of FIG. 1, with portions broken away, showing details of the gear drive and illustrating the pinion construction of the present invention.

FIGS. 1 and 2 illustrate a reversing gear drive mechanism of known construction, see for example U.S. Pat. No. 2,304,031, to illustrate a typical gear drive with which the present invention may be incorporated. The gear drive is referred to by the general reference numeral 1 and is contained within a housing 2 of appropriate configuration. The gear drive includes a forward-drive pinion 3 which meshes with a driven gear 4. The pinion 3 is carried on shaft 5 which is journaled in walls of the housing 2 and has an end 6 projecting therefrom, and the gear 4 is carried on a shaft 7 journaled in the walls of the housing and has an end 8 projecting therefrom at the side opposite to the end 6 of shaft 5.

The end 6 of the shaft 5 of the forward-drive pinion carries a clutch element comprising a clutch drum 9 attached near its outer end. The clutch drum 9 is disposed within a coacting outer clutch element 10 which carries a flexible annular tubular gland 11, which may be made of rubber or a rubber composition reinforced in suitable manner. A second outer clutch member 12 is joined to the first clutch member 10 and carries a second inflatable annular tubular gland 13 which is adapted to expand to cause driving engagement between clutch member 12 and a clutch drum element 14 fixed to a flange 15 at the end of a hollow pinion 16. The clutch glands 11 and 13 are each supplied with fluid under pressure through tubes such as tubes 22 and adapted to expand into driving engagement with their respective clutch drums 9 and 14 or retract to a disengaged position. The hollow pinion 16 is supported in bearings 17 and 18 mounted on the walls of the housing. The hollow pinion 16 encircles the shaft 5 of the pinion 3 and is supported concentrically and separately therefrom. The pinion 16 meshes with a pinion 19 carried on a countershaft 20 journaled in the walls of the housing in suitable bearings and and running parallel to the shaft 5 of the forward-drive pinion. The countershaft 20 at its opposite end includes a pinion 21 that meshes with the driven gear 4 to act as the reverse-drive pinion.

In a typical installation on a ship, the engine, which may comprise an internal combustion engine or steam or gas turbine, may be connected to the shaft 23 through a suitable coupling, and the propeller shaft connected to the end 8 of the shaft 7 which projects from the opposite side of the housing of the gear drive. The coaction of the various elements is such that when both clutch glands 11 and 13 are deflated, pinions 3 and 21 and driven gear 4 are stationary or at rest. When the clutch gland 11 is inflated and the clutch gland 13 deflated, (the condition shown in FIG. 2), the pinion 3 rotates to drive the driven gear 4 in the forward direction, while the pinion 21 is in an idle condition. On the other hand, when the clutch gland 11 is deflated and the clutch gland 13 inflated, the pinion 16 meshes with the pinion 19 to allow the pinion 21 to drive the driven gear 4 in the reverse direction, while the forward pinion 3 is in an idle condition.

The pinion 21 as shown in FIGS. 2–5 is constructed in accordance with this invention and includes a major toothed portion 30 and a minor toothed portion 31, both supported on the shaft 20. The pinion is shown in FIG. 2 as a herringbone or double-helical type, although it may be made with other tooth forms such as spur, single-helical, etc.

A section of the pinion 21 is shown in detail in FIG. 3. The major toothed portion 30 is illustrated as being formed integral with the shaft 20, but it may also be a separate element rigidly affixed to the shaft. A bushing 32 having a hub 33 and an annular collar 34 is inserted between the minor toothed portion 31 and the shaft 20 and is fastened to the shaft by means of set screws 35 spaced about the circumference of the bushing. The inner surface 36 (see FIG. 4) of the minor toothed portion 31 rides on the outer surface of the hub 33 of the bushing. The minor toothed portion 31 is connected to the bushing 32 by a plurality of torsionally flexible cylindrical keys 37 which are made of rubber, neoprene, or other resilient material. The torsionally flexible keys 37 are carried in apertures 38 of which the upper section 38a is formed along the inner portion of the minor toothed portion 31 and the lower section 38b is formed along the hub 33 of the bushing, see especially FIG. 4. One side of the minor toothed portion 31 bears against the collar of the bushing 32, and the opposite side bears against a frictional spacer ring 40 which is urged thereagainst by a series of springs 41 carried in recesses 42 formed in the major toothed portion 30; in this fashion, the minor toothed portion 31 is located axially on the shaft 20 of the pinion. The frictional spacer ring 40 (which may be made of bronze, brake material, and the like) is an optional element which is intended to augment the torsional frictional resistance and damping to the minor toothed portion 31 where needed to supplement the torsional resistance provided by the flexible keys 37 (or the springs 47 described below with respect to FIG. 6).

Turning now to FIG. 5, which illustrates a horizontal sectional view showing the pinion 21 meshed with the gear 4, the thickness of teeth to the major toothed portion 30, shown as $W_1$ in FIG. 5 is less than the thickness $W_2$ of the teeth of the minor toothed portion 31. Thus there is greater backlash between the teeth of the major toothed portion 30 and a tooth space 4a of the gear 4 than there is between the teeth of the minor toothed portion 31 and the tooth space 4a. The purpose of this difference in teeth thickness is discussed in the next paragraph.

The operation of the pinion 21 will now be explained with reference to FIGS. 5–5b. In FIG. 5, the "at rest" condition is illustrated, and there is clearance on either side of the teeth of the major toothed portion 30 and the minor toothed portion 31 of the pinion 21 and the surrounding teeth 4b of the driven or bull gear 4. This condition obtains when both the reverse pinion 21 of this invention and forward drive pinion 3 (see FIG. 2) are de-clutched. When the clutches are actuated so that the drive is in the forward drive condition indicated by the arrow 43 in FIG. 5a, (i.e. clutch gland 11 is inflated, and clutch gland 13 is deflated, see FIG. 2) the gear 4 will be driven by the forward pinion 3, and the reverse pinion 21 will be in its idle condition, i.e. it is de-clutched. As shown in FIG. 5a, the action of the pinion 21 is such that the teeth of the minor toothed portion 31 will contact a side 4c of the tooth of the gear 4, and because the thickness $W_2$ of the teeth of this portion 31 is greater than the thickness $W_1$ of the teeth of the major toothed portion 30, the teeth of the latter will not contact the sides of the teeth 4b on the gear 4. Further, the material of the torsionally resilient driving keys 37 is chosen to have suitable stiffness that will prevent the teeth of the major toothed portion 30 from contacting the teeth on the bull gear 4. In this condition, in which the reverse pinion 21 is in an idle state, the bull gear 4 will drive the reverse gear train through the minor toothed portion of 31 which, because of the torsionally resilient means 37, is a flexible driving engagement and thereby the natural response of the reverse train is tuned below any excitation frequency which would cause vibrations or rattling that might lead to tooth or gear damage or excessive wear. When the gear 4 is to be driven in the reverse direction as indicated by the arrow 44 in FIG. 5b, i.e. the clutch gland 11 is deflated and the clutch 13 is inflated, power from the prime mover is transmitted through to the reverse pinion 21 and, in such condition, the teeth of the minor toothed portion 31 will contact a side 4c of the teeth 4b of the bull gear but the power from the prime mover will be sufficient to cause the teeth on the major toothed portion 30 to also contact the sides 4c of the bull gear teeth because, under driving load, the torsionally resilient driving means 37 will enable this relative twisting or relative motion between the two portions of the pinion 21. Thus in the reverse drive condition, the teeth on the major toothed portion will transmit the driving load from the prime mover to the bull gear 4. The face width of the teeth on the major toothed portion should be sufficient to transmit the loads which will be encountered during the reverse drive state.

Figure 6:
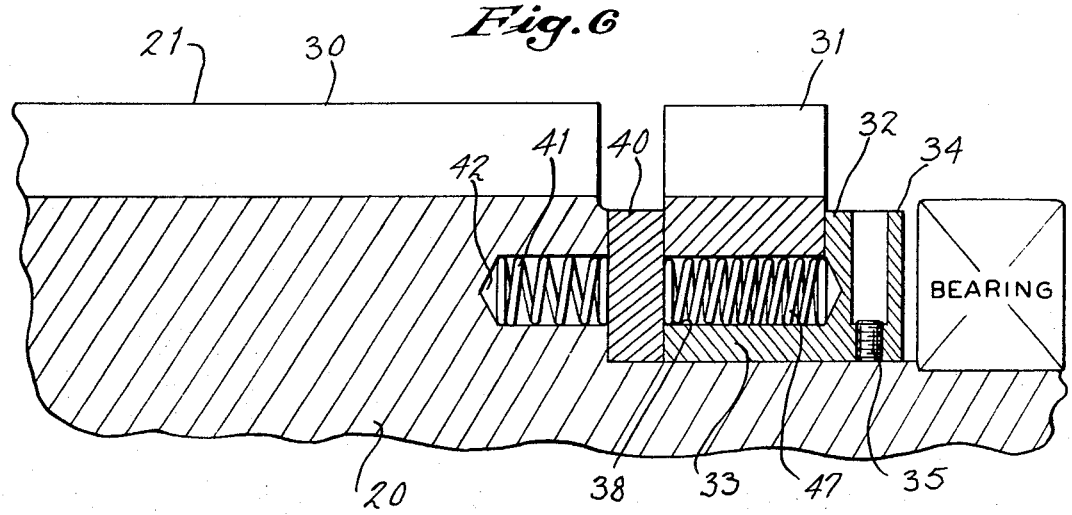
FIG. 6 is a longitudinal sectional view, with portions broken away, similar to FIG. 3 but illustrating a second embodiment of this invention.

FIG. 6 illustrates a second embodiment of my new pinion construction wherein the torsionally resilient driving means connecting the minor toothed portion 31 of the pinion to the shaft 20 comprises a plurality of springs 47. As with the torsionally resilient rubber keys 37 illustrated in FIG. 3, the torsionally resilient springs 47 are chosen so as to have sufficient stiffness to prevent the major toothed portion 30 from coming into contact with the driven gear when the pinion 21 is in its idle condition, but enabling deflection between the major toothed portion 30 and minor toothed portion 31 when a driving load is transmitted to the pinion 21.

It has been calculated, for example, that if the minor toothed portion 31 of the pinion 21 had to take up about 5 horsepower when the pinion is in an idle condition while meshed with a driven gear, the force on the torsionally resilient driving means 37 or 47 would be on the order of about 100 lb., and the stiffness of such driving means could be on the order of $0.05 \times 10^6$ inch pounds per radian to give the desired action. The natural response frequency of the reverse train with the amount of flexibility would be only about 1.5 cps.

There has thus been described a new pinion construction comprising two toothed portions mounted on a shaft: a major toothed portion which is rigidly mounted on the shaft and a minor toothed portion which is carried on the shaft, and adapted for relative movement in relation to the major toothed portion, by means of torsionally flexible driving means. The terms major and minor are defined herein to mean that the major toothed portion is to comprise over 50 percent of the face width of the particular pinion construction and the minor toothed portion is to comprise less than 50 percent thereof. The particular face width of the major tooth portion will, in accordance with usual gear design, be selected to be sufficient to transmit the driving loads which will be encountered in the specific gear drive with which the pinion of this construction would be used. The minor toothed portion operates to drive the reverse gear train when the pinion is in an idle condition and reduce or eliminate vibrations which can be transmitted to such train when it is in idle, thereby lessening the potential for damage to the reverse pinion itself or its associated gears or other equipment. The pinion construction disclosed herein may be used in various types of gear drive in addition to the marine unit shown in the drawings, such as drives for loaders, cranes, bulldozers, industrial tractors, and other drives which include reverse gearing that idles freely during forward operation of the drive.

Although two specific embodiments of this invention have been herein described for the purposes of illustration, it is expected that changes can be made in the described embodiments and that other embodiments can be devised which will still be within the concept of this invention, and it is understood that it is intended to cover all such changes and modifications which do not constitute a departure from the true spirit and scope of this invention.

I claim:

1. A pinion construction comprising, in combination: a shaft;
   a major toothed portion rigidly mounted on the shaft;
   a minor toothed portion, and torsionally resilient drive means connecting the minor toothed portion to the shaft;
   the teeth of the minor toothed portion being thicker than the teeth of the major toothed portion.

2. A pinion according to claim 1, wherein:
   the torsionally resilient driving means includes a bushing element attached to the shaft and a plurality of resilient driving keys connecting the minor toothed portion to the bushing element.

3. A pinion construction according to claim 2 wherein the bushing element includes a hub portion on which the minor toothed portion of the pinion is supported and a collar portion which bears against a side of the minor toothed portion.

4. A pinion according to claim 1, further including:
   spacer means positioned between the major toothed portion and the minor toothed portion; and
   spring means carried by the major toothed portion and arranged to urge the spacer means against the minor toothed portion.

5. A pinion construction comprising, in combination: a shaft;
   a major toothed portion rigidly mounted on the shaft;
   a bushing element mounted on the shaft and including a hub portion carried on the shaft and a collar portion;
   a minor toothed portion which is rotatably mounted on the hub portion of the bushing element;
   torsionally resilient drive means connecting the minor toothed portion to the hub portion of the bushing element; and
   spacer means between the major toothed portion and the minor toothed portion and arranged to bear against one side of the minor toothed portion, the collar portion of the bushing element being arranged to bear against an opposite side of the minor toothed portion.

6. In a gear drive having a driven gear, a forward pinion meshed with the driven gear to drive it in one direction, a reverse pinion meshed with the driven gear to drive it in an opposite direction, and means to selectively connect one of said pinions to a prime mover to drive the driven gear while the other pinion rotates in an idle condition, the improvement wherein:
   the reverse pinion comprises a shaft, a major toothed portion rigidly mounted on the shaft, a minor toothed portion mounted on the shaft and rotating relative to the major toothed portion, the teeth of the minor toothed portion being thicker than the teeth of the major toothed portion, and the teeth of both portions being meshed with teeth of the driven gear;

the minor toothed portion contacting the sides of teeth of the driven gear when the reverse pinion is in an idle condition with the teeth of the major toothed portion being out of contact with said sides; and both the major toothed portion and the minor toothed portion contacting the sides of teeth of the driven gear when the reverse pinion is connected to a prime mover to drive the driven gear.

7. A gear drive according to claim 6, wherein the reverse pinion includes torsionally resilient driving means connecting the minor toothed portion to the shaft, said driving means being flexible to admit relative motion between the minor toothed portion and the major toothed portion when the reverse pinion transmits driving loads but limit relative motion between the minor toothed portion and major toothed portion when the reverse pinion is in an idle condition to thereby prevent contact between teeth of the major toothed portion and teeth of the driven gear when the reverse pinion is in an idle condition.

* * * * *